June 25, 1968 M. E. HODGES 3,390,279

LOGICAL CONTROL MEANS UTILIZING TIME DELAY AND KNOCKOUT "AND" CIRCUITS

Original Filed Dec. 16, 1960

INVENTOR:
MERWYN E. HODGES,

BY Albert S. Richardson Jr.
ATTORNEY

United States Patent Office 3,390,279 Patented June 25, 1968

3,390,279

LOGICAL CONTROL MEANS UTILIZING TIME DELAY AND KNOCKOUT "AND" CIRCUITS

Merwyn E. Hodges, Broomall, Pa., assignor to General Electric Company, a corporation of New York Original application Dec. 16, 1960, Ser. No. 76,209, now Patent No. 3,176,190, dated Mar. 30, 1965. Divided and this application Nov. 24, 1964, Ser. No. 413,579
3 Claims. (Cl. 307—208)

This is a division of patent application Ser. No. 76,209, filed Dec. 16, 1960, which application matured as Patent No. 3,176,190 on March 30, 1965.

The present invention relates to electric control means for producing an output signal in delayed response to the application of a continuous "pickup" signal under conditions of predetermined phase relationships between periodic blocking and keying signals, and more particularly it relates to an improved transistor logic circuit designed to accomplish this result.

An object of this invention is to provide means especially well suited for performing the "transient blocking function" in the phase-comparison protective relaying system that is the subject matter of my original case, S.N. 76,209.

In carrying out my invention in one form, I provide a time delay circuit for producing an output control signal only after having been energized continuously for a predetermined length of time in response to the presence of a pickup signal. Knockout means is provided for deenergizing the time delay circuit during the periods that an input keying signal persists, and blocking means is provided for disabling the knockout means, thereby preventing the deenergization of the time delay circuit, during the periods that an input blocking signal persists.

Figure 1:
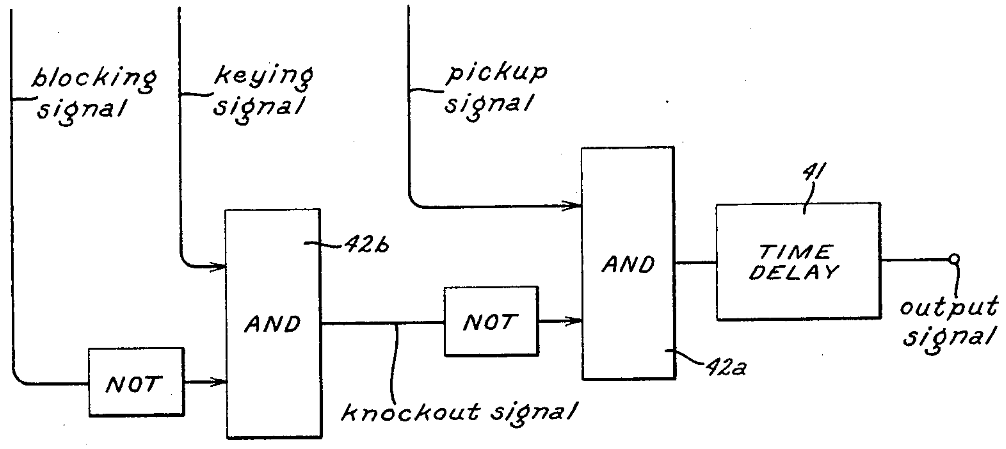
Figure 2:
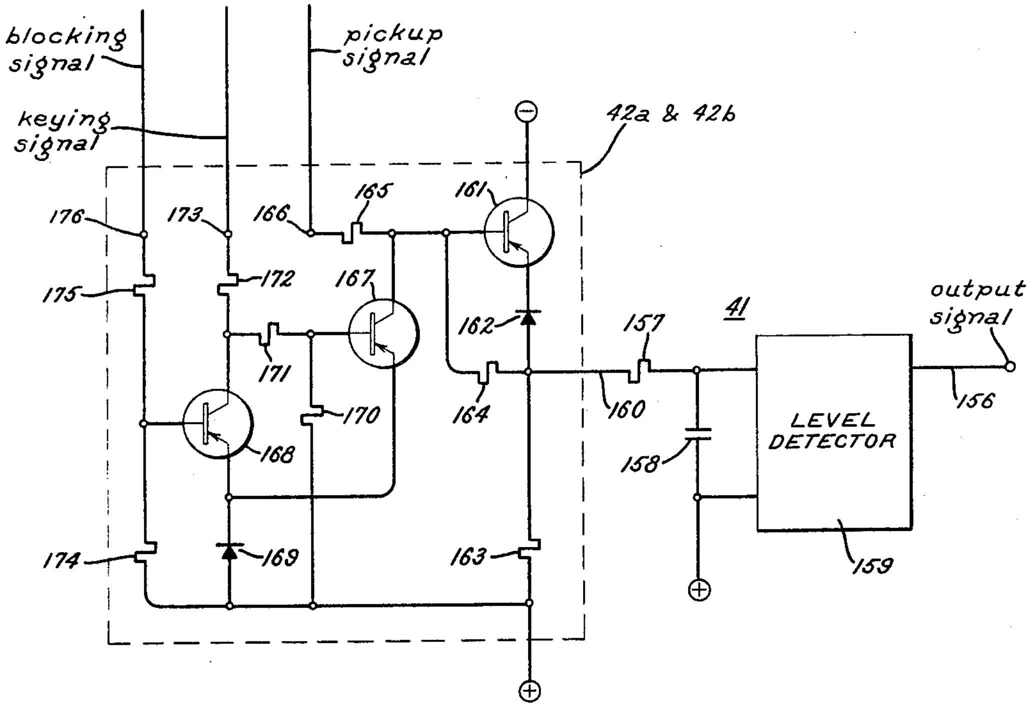

My invention will be better understood and its various objects and advantages will be more fully appreciated from the following description taken in conjunction with the accompanying drawing in which:

FIG. 1 is a schematic block diagram of a logic circuit embodying my invention; and FIG. 2 is a schematic circuit diagram illustrating the components and circuitry of the logic circuit shown in FIG. 1.

Referring now to FIG. 1, I have shown in block form, for the purpose of illustrating a preferred embodiment of my invention, a time delay circuit 41 that is designed to produce a predetermined output signal only after a time delay of one and one-half cycles (on a 60-cycles-per-second base) upon continuous energization thereof. The time delay circuit 41 is unable to produce an output when energized periodically on a half-cycle basis.

The time delay circuit 41 is connected to the output of a pickup logic component **42*a*, labeled "AND," which operates to energize the time delay circuit upon receipt of a continuous "pickup signal." However, the pickup logic component 42*a* is so arranged that it can NOT operate when additionally energized by a knockout signal received from a knockout logic component 42*b* which in turn is activated during intervals of energization by an intermittent "keying signal." However, the knockout logic component 42*b*** is so arranged that it will NOT produce the knockout signal in the presence of a "blocking signal" that is periodically applied thereto.

The output signal that the time delay circuit 41 produces can be utilized as a transient blocking signal in the manner fully set forth in my aforesaid original case. The nature and the sources of the pickup signal, the keying signal, and the blocking signal are also explained in that case. For the present it is sufficient to note only that the latter two are intermittent signals having periods of approximately one-half cycle duration (on a 60-cycles-per-second base) which are either in phase or approximately 180 degrees out-of-phase with respect to each other. (The term "period" as it is used in this specification with reference to intermittent or periodic signals, is meant to identify only a portion of time or an interval during which such a recurring signal is in existence.)

The operation of the logic circuit shown in FIG. 1 can now be summarized. The knockout logic component **42*b*, which generates a knockout signal periodically to disable the pickup logic component 42*a* in controlled response to the intermittent keying signal, is itself disabled and its disabling effect on component 42*a* is blocked or prevented throughout the blocking signal periods. Consequently, when the successive intervals of activation of the knockout logic component 42*b* are concurrent with the half-cycle periods of the blocking signal, and a pickup signal is being applied, the pickup logic component 42*a* is operable continuously to energize the time delay circuit 41 which will produce its output signal in delayed response thereto. On the other hand, whenever there is a 180-degree displacement between an interval of activation and a blocking signal period, a half-cycle periodic knockout signal is produced, the time delay circuit 41** is energized only between successive periods of the knockout signal, and the time delay circuit can produce no output signal (or its output signal, if it was previously being produced, is discontinued after a time delay of one and one-half cycles).

Turning next to FIG. 2, a preferred embodiment of the FIG. 1 circuit will now be described in greater detail. The time delay means 41 is seen to comprise a resistor 157, a capacitor 158, and a level detector 159. The R-C circuit formed by the resistor 157 and capacitor 158 is connected between a conductor 160 and a reference bus. The illustrated reference bus is connected to the positive terminal of a suitable source of regulated D-C supply voltage, and I have used the encircled positive and negative symbols "+" and "−" in FIG. 2 to represent the terminals of such a source. The relatively positive terminal (+) comprises the common bus for the transistor circuits. The magnitude of the supply voltage preferably is 25 volts.

The capacitor 158 will accumulate charge upon energization of the conductor 160 by a potential of negative polarity with respect to the reference bus. The voltage across capacitor 158 provides an input signal for the level detector 159 which is connected thereto. The level detector 159, shown in block form in FIG. 2, comprises appropriate means for producing at a conductor 156 that emanates therefrom a negative output signal of substantially constant magnitude in substantially instantaneous response to the magnitude of its input attaining a first predetermined critical level, and the signal so produced is maintained until the input magnitude falls below a second predetermined critical level, the second critical level being lower than the first. For this level detector I prefer to use the exceptionally accurate and stable transistor switching circuit disclosed and claimed in my Patent 3,067,340.

The parameters of the R-C circuit 157, 158 and the level detector 159 are selected so that the charge on capacitor 158 will not reach the first critical level, required to trigger the level detector 159, until the conductor 160 is continuously energized by a predetermined negative signal for a period of one and one-half cycles (on a 60 c.p.s. base). The charge on capacitor 158 will never attain this first critical level if the conductor 160 is periodically energized for intervals of only one-half cycle during each cycle. If such half-cycle energization of the conductor 160 should occur sometime after the conductor 160 has been continuously energized for sufficiently long to cause operation of the level detector 159, the charge on capacitor 158 will not fall below the second critical level (and subsequently remain below its first critical level) until the conductor 160 is continuously deenergized for an entire one-half cycle interval.

Energization of the conductor 160 is controlled by the pickup logic component 42*a* which comprises a PNP transistor 161. In FIG. 2 the transistor 161 is shown within the broken-line block identified by the reference characters 42*a* and 42*b*. The collector of transistor 161 is connected directly to the negative supply voltage terminal, while its emitter is connected through a silicon diode 162 and an emitter follower resistor 163 to the reference bus. The base electrode of this transistor is connected to the resistor 163 by a base resistor 164. Circuit means, including a current limiting resistor 165, is provided to connect the base electrode of transistor 161 to a first input terminal 166 which is adapted to be energized by a continuous pickup signal of negative polarity with respect to the reference bus. The conductor 160 is connected to the relatively negative terminal of the emitter follower resistor 163.

The silicon diode 162 is poled in agreement with the emitter-base junction of the transistor 161. This diode is provided to ensure that the transistor does not operate as a result of collector leakage current. Since a silicon diode inherently presents a relatively high impedance to the passage of a small quantity of forward current, the greater portion of the collector leakage current of transistor 161 prefers to follow a parallel path through the base resistor 164 thereby avoiding amplification which would take place if it were able to follow a path through the emitter-base junction of this transistor. As a result, the transistor 161 will remain inactive until its base electrode is energized by the pickup signal.

Whenever the pickup signal is applied to the input terminal 166, this terminal is energized by a substantially constant-magnitude negative signal which can effect current flow in the emitter-base junction of the transistor 161. Upon activation of transistor 161 in this manner, its emitter-collector circuit being then in a low-impedance state, a large portion of the supply voltage will appear across the emitter follower resistor 163, and the conductor 160 is effectively energized by a relatively large negative potential. If this energization of conductor 160 should continue without interruption, the time delay means 41 will produce its output signal at conductor 156 after a time delay of one and one-half cycles.

For the purpose of preventing continuous energization of the conductor 160 when the keying and blocking signals are 180 degrees out-of-phase with respect to each other, my control means includes the knockout logic component 42*b* which comprises a pair of PNP transistors 167 and 168. The collector of the transistor 167 is connected directly to the base electrode of the transistor 161, while the emitter of transistor 167 is connected through a silicon diode 169 to the reference bus. Thus, the emitter-collector circuit of the transistor 167 is connected in parallel circuit relationship with the emitter-base junction of transistor 161. The base electrode of the transistor 167 is connected through a base resistor 170 to the reference bus, and by means of a circuit including a pair of resistors 171 and 172, it is also connected to a second input terminal 173 of the control means.

A unipolarity keying signal is intermittently applied to the input terminal 173, and when present it causes this terminal to be energized by a substantially constant-magnitude potential of negative polarity with respect to the reference bus. During these half-cycle intervals of energization a negative knockout signal is generated at the base electrode of the transistor 167. This periodic knockout signal effects current flow in the emitter-base junction of the transistor 167, thereby activating this transistor. It is apparent in FIG. 2 that whenever the transistor 167 is active, its emitter-collector circuit being then in a low-impedance state, the pickup signal applied to the input terminal 166 is bypassed to the reference bus, activation of transistor 161 is prevented, and while the transistor 161 is thus disabled, the conductor 160 cannot be effectively energized.

The transistor 167 is itself disabled (rendered nonconductive) by the companion transistor 168. As can be seen in FIG. 2, the collector of transistor 168 is connected through the resistor 172 to terminal 173, while the emitter of the transistor 168 is connected through the silicon diode 169 to the reference bus. The function of the diode 169 is to prevent activation of either transistor 167 or 168 as a result of collector leakage current. The base electrode of the transistor 168 is connected through a base resistor 174 to the reference bus, and by means of a circuit including a current limiting resistor 175, it is also connected to a third input terminal 176 of the control means. The input terminal 176 is adapted to be energized by the negative blocking signal.

Energization of the base electrode of the transistor 168 by the blocking signal effects current flow in the emitter-base junction of this transistor. Upon activation of the transistor 168 in this manner, its emitter-collector circuit being then in a relatively low-impedance state, the quantity energizing the input terminal 173 is bypassed to the reference bus and no knockout signal can be produced at the base electrode of the transistor 167. Thus, activation of the transistor 167 is prevented whenever the input terminal 176 is energized by the blocking signal. As long as the transistor 167 is disabled in this manner, effective energization of the conductor 160 cannot be prevented.

The overall operation of the control means can be briefly stated. The conductor 160 will be effectively energized when a pickup signal is applied to the input terminal 166, except during those periods when the input terminal 173 is being energized by the keying signal in the absence of energization of the input terminal 176 by a blocking signal. So long as the latter two signals occur contemporaneously, the conductor 160 will be energized continuously and the time delay circuit 41 is able to produce its output signal in delayed response thereto. On the other hand, if there were no blocking signal during the intervals that the input terminal 173 is energized, a half-cycle periodic knockout signal will be produced, and the time delay circuit 41 is energized only between successive periods of this knockout signal. As a result of the periodic deenergization of the time delay circuit, no output signal will be produced or, if previously being produced, it will be discontinued after a time delay of one-half to one and one-half cycles.

While I have shown and described a preferred form of my invention by way of illustration, many modifications will occur to those skilled in the art. I contemplate, therefore, by the claims which conclude this specification to cover all such modifications as fall within the true spirit and scope of my invention.

What I claim as new and desire to secure by U.S. Letters Patent is:

1. Electric control means for producing an output signal in delayed response to the application of a continuous pickup signal under conditions of predetermined phase relationships between periodic blocking and keying signals, comprising: time delay means for producing the output signal after a predetermined time delay upon continuous energization thereof; circuit means connected to the time delay means and controlled by the pickup signal for energizing the time delay means in response to application of the pickup signal, knockout means connected to the circuit means and controlled by the keying signal for preventing energization of the time delay means during the keying signal periods, said time delay means being incapable of producing said output signal when energized only during the intervals between successive periods of the keying signal; and blocking means connected to the knockout means for controlled by the blocking signal for disabling the knockout means, thereby blocking its energization-preventing function, during the blocking signal periods.

2. In a transistor logic circuit: a pair of D–C supply voltage terminals; first, second and third normally inactive transistors each of which comprises a collector, emitter and base electrode; the collector and emitter of said first transistor being connected between said supply voltage terminals and having in circuit therewith means for developing an output signal in response to activation thereof; first, second and third input terminals; first circuit means, including said first input terminal, connected to the base electrode of said first transistor and arranged to effect current flow in the emitter-base junction of the first transistor, thereby activating the first transistor, in response to the application of a predetermined pickup signal to the first input terminal; means connecting the collector and emitter of said second transistor in parallel circuit relationship with the emitter-base junction of the first transistor; second circuit means, including said input terminal, connected to the base electrode of said second transistor and arranged, in response to the application of a predetermined keying signal to the second input terminal, to effect current flow in the emitter-base junction of the second transistor thereby activating the second transistor and, consequently, preventing activation of said first transistor; means connecting the collector and emitter of said third transistor in parallel circuit relationship with the emitter-base junction of said second transistor; and third circuit means, including said third input terminal, connected to the base electrode of said third transistor and arranged, in response to the application of a predetermined conditional signal to the third input terminal, to effect current flow in the emitter base junction of the third transistor thereby activating the third transistor and consequently rendering said second transistor inactive.

3. In a condition responsive transistor circuit: a pair of D–C supply voltage terminals; first, second and third normally inactive transistors each of which comprises a collector, emitter and base electrode; the collector and emitter of said first transistor being connected between said supply voltage terminals and having in circuit therewith means for developing an output signal in response to activation thereof; first, second and third input terminals; first circuit means, including said first input terminal, connected to the base electrode of said first transistor and arranged to effect current flow in the emitter-based junction of the first transistor, thereby activating the first transistor, in response to continuous energization of the first input terminal by a predetermined pickup voltage; means connecting the collector and emitter of said second transistor in parallel circuit relationship with the emitter-base junction of the first transistor; second circuit means, including said second input terminal, connected to the base electrode of said second transistor and arranged, in response to energization of the second input terminal by a periodic keying voltage, to effect current flow in the emitter-base junction of the second transistor thereby activating the second transistor and, consequently, preventing activation of said first transistor during the keying voltage periods; means connecting the collector and emitter of said third transistor in parallel circuit relationship with the emitter-base junction of said second transistor; and third circuit means, including said third input terminal, connected to the base electrode of said third transistor and arranged, in response to energization of the third input terminal by a periodic blocking voltage, to effect current flow in the emitter-base junction of the third transistor thereby activating the third transistor and consequently rendering said second transistor inactive during the blocking voltage periods.

No references cited.

ARTHUR GAUSS, *Primary Examiner.*

R. H. PLOTKIN, *Assistant Examiner.*